US012666453B2

(12) United States Patent
Dudda et al.

(10) Patent No.: US 12,666,453 B2
(45) Date of Patent: Jun. 23, 2026

(54) DUPLICATE TRANSMISSION OF PROTOCOL DATA UNITS

(71) Applicant: Telefonaktiebolaget LM Ericsson (PUBL), Stockholm (SE)

(72) Inventors: Torsten Dudda, Wassenberg (DE); Ying Sun, Täby (SE)

(73) Assignee: Telefonaktiebolaget LM Ericsson (PUBL), Stockholm (SE)

( * ) Notice: Subject to any disclaimer, the term of this patent is extended or adjusted under 35 U.S.C. 154(b) by 318 days.

(21) Appl. No.: 18/556,139

(22) PCT Filed: Apr. 20, 2021

(86) PCT No.: PCT/EP2021/060281
§ 371 (c)(1),
(2) Date: Oct. 19, 2023

(87) PCT Pub. No.: WO2022/223104
PCT Pub. Date: Oct. 27, 2022

(65) Prior Publication Data
US 2024/0188111 A1 Jun. 6, 2024

(51) Int. Cl.
*H04W 72/512* (2023.01)
*H04L 1/08* (2006.01)
*H04L 1/1812* (2023.01)

(52) U.S. Cl.
CPC ............. *H04W 72/512* (2023.01); *H04L 1/08* (2013.01); *H04L 1/1816* (2013.01)

(58) Field of Classification Search
CPC ... H04W 72/512; H04W 28/06; H04W 28/24; H04W 80/02; H04L 1/08; H04L 1/1816; H04L 69/322
See application file for complete search history.

(56) References Cited

U.S. PATENT DOCUMENTS

| | | | | |
|---|---|---|---|---|
| 2018/0279168 A1* | 9/2018 | Jheng | | H04L 5/001 |
| 2018/0324642 A1* | 11/2018 | Yu | | H04W 36/0055 |
| 2021/0037595 A1* | 2/2021 | Jin | | H04W 76/27 |

FOREIGN PATENT DOCUMENTS

CN 117083966 A * 11/2023 ............... H04L 1/08

OTHER PUBLICATIONS

3GPP TSG-RAN2 Meeting #100; Reno, USA, Nov. 28-Dec. 1, 2017; Agenda Item: 9.15; Source: OPPO; Title: Discussion on use case of UL duplication (R2-1712191).
3GPP TSG-RAN WG2 NR AH; Vancouver, Canada, Jan. 22-Jan. 26, 2018; Agenda item: 10.3.3.5 (NR_newRAT-Core); Source: LG Electronics Inc.; Title: Initial state of PDCP duplication (R2-1801408).

(Continued)

*Primary Examiner* — Mohamed A Kamara
(74) *Attorney, Agent, or Firm* — Baker Botts L.L.P.

(57) ABSTRACT
There is provided mechanisms for triggering uplink PDU duplication from a user equipment. A method is performed by a network node. The method comprises configuring the user equipment with an RLC URLLC mode. According to the RLC URLLC mode the user equipment is configured with an RLC trigger for the user equipment to perform uplink PDU duplication for an URLLC service.

17 Claims, 6 Drawing Sheets

S102
Configure user equipment with RLC URLLC mode

S104
Cancelling ongoing HARQ retransmission of PDUs

(56)             References Cited

OTHER PUBLICATIONS

3GPP TSG-RAN WG2 Meeting #108; Reno, USA, Nov. 18-22, 2019; Agenda Item: 6.7.4.2; Source: Institute for Information Industry (III); Title: UE-assisted Activation/Deactivation for UL PDCP Duplication Enhancements (R2-1915245).
PCT International Search Report issued for International application No. PCT/EP2021/060281—Jan. 28, 2022.
PCT Written Opinion of the International Searching Authority issued for International application No. PCT/EP2021/060281—Jan. 28, 2022.

* cited by examiner

DUPLICATE TRANSMISSION OF PROTOCOL DATA UNITS

PRIORITY

This nonprovisional application is a U.S. National Stage Filing under 35 U.S.C. § 371 of International Patent Application Serial No. PCT/EP2021/060281 filed Apr. 20, 2021 and entitled "DUPLICATE TRANSMISSION OF PROTOCOL DATA UNITS" which is hereby incorporated by reference in its entirety.

TECHNICAL FIELD

Embodiments presented herein relate to a method, a network node, a computer program, and a computer program product for triggering protocol data unit (PDU) duplication from a user equipment. Embodiments presented herein further relate to a method, a user equipment, a computer program, and a computer program product for uplink PDU duplication.

BACKGROUND

In communication networks, there may be a challenge to obtain good performance and capacity for a given communications protocol, its parameters and the physical environment in which the communication network is deployed. For example, two parameters in providing good performance and capacity for a given communications protocol in a communication network are reliability and low latency.

In this respect, ultra-reliable and low latency communication (URLLC) requirements specified for the New Radio (NR) air interface by the third generation partnership project (3GPP) are intended to handle a variety of scenarios in which high reliability and low latency are required. Examples of such scenarios appear in the automotive safety field, in factory automation, as well as in applications of augmented and virtual reality functionality with tactile feedback. The performance requirements are then enhanced, from capacity/spectral efficiency requirements related to wireless mobile broadband services, to include also stringent requirements on round trip latency and reliability. Typically, the latency requirements could reach sub-millisecond figures and the reliability requirements could reach packet loss probabilities as low as $10^{-6}$ to $10^{-4}$.

With regards to reliability, it is noted that current wireless mobile broadband transmission systems are optimized for operation at a block-error rate of 1-10%, meaning that error rates of about $10^{-2}$ are achievable without re-transmissions.

With regards to reliability, there is not any existing retransmission scheme with the purpose to optimize both spectrum efficiency and latency at higher protocol layers.

To meet application layer reliability requirements, there are many existing tools at different protocol layers. One of the most commonly used tools is retransmission schemes, as for example used on the Transmission Control Protocol (TCP), Packet Data Convergence Protocol (PDCP), Radio Link Control (RLC), and Medium Access Control (MAC) protocol layers. These retransmission schemes are used when transmission feedback indicates that transmission has failed. For example, a MAC protocol layer failure resulting from failed hybrid automatic repeat request (hybrid ARQ or HARQ) (re-)transmissions on the MAC protocol layer will trigger a retransmission of an RLC packet; multiple RLC retransmission failures will result in a failed transmission of the payload data, e.g. TCP packets. At the TCP layer, if a TCP acknowledge is not received, a retransmission of the TCP packet will be triggered.

These retransmission schemes are thus used on demand and based on transmission feedback and optimized for resource utilization efficiency. For example, if a transmission fails, a retransmission is triggered, and extra resources are consumed only if a retransmission occurs. However, since any retransmission loop will require at least a round trip time delay to receive the feedback information, these retransmission schemes are not optimized to minimize latency and transmission delay.

As an example, in Table 5.7.4-1 in section 5.7 of 3GPP TS 23.501 V16.3.0, for a service, such as an electricity distribution high voltage service, with a guaranteed delay critical Guaranteed Bit Rate (GBR) with Quality of Service Class Identifier CQI (also denoted 5QI, which is short for 5G QoS Identifier) value 85 (i.e., CQI=85 or 5QI=85), and with required packet error rate loss of $10^{-5}$ and a packet delay budget (PDB) of 5 ms. A static value for the core network (CN) PDB of 2 ms for the delay between a user plane function (UPF) terminating interface N6 and a 5G-AN (where AN is short for access network) should be subtracted from a given PDB to derive the packet delay budget that applies to the air interface. This is the most challenging QoS requirement in the current specifications, which requires both very low latency and low error rate. In order to fulfill the overall package delay budget of 5 ms, a delay budget of 3 ms is needed at the air interface. Retransmissions that potentially are required for reliability purposes on different protocol layers are not affordable due to the latency constraint.

When PDCP duplication is applied, the PDCP packets are duplicated on different carriers or in different frequency bands based on dual connectivity schemes and carrier aggregation schemes. Currently, a maximum of four copies of the same PDCP packet are supported. The number of copies is configured at Radio Resource Control (RRC) level and can be activated through the use of a MAC control element (CE) or RRC configuration.

However, there is currently no RLC mode ideal for URLLC services. In this respect, RLC unacknowledged mode does not satisfy the necessary reliability requirements, and RLC acknowledged mode does not satisfy the necessary latency requirements. PDCP duplications of the radio bearer to which RLC belong are possible, making use of multiple RLC entities, but transmissions among those RLC entities may not always be time-aligned. Reliability tools such as repetitions and HARQ are provided at the MAC layer but these tools are service agnostic, implying that if repetitions for reliability would be configured, those would be applied to all services, independent of their reliability requirements, thus causing many unnecessary retransmissions to be performed.

Hence, there is still a need for transmission techniques for PDUs belonging to URLLC services that enable both reliability requirements and latency requirements to be satisfied.

SUMMARY

An object of embodiments herein is to address the above issues by providing transmission techniques that enable both reliability requirements and latency requirements to be satisfied for PDUs belonging to URLLC services.

According to the herein disclosed embodiments, the object is achieved by the use of an RLC URLLC mode that the user equipment is configured with.

According to a first aspect there is presented a method for triggering uplink PDU duplication from a user equipment. The method is performed by a network node. The method comprises configuring the user equipment with an RLC URLLC mode. According to the RLC URLLC mode the user equipment is configured with an RLC trigger for the user equipment to perform uplink PDU duplication for an URLLC service.

According to a second aspect there is presented a network node for triggering uplink PDU duplication from a user equipment. The network node comprises processing circuitry. The processing circuitry is configured to cause the network node to configure the user equipment with an RLC URLLC mode. According to the RLC URLLC mode the user equipment is configured with an RLC trigger for the user equipment to perform uplink PDU duplication for an URLLC service.

According to a third aspect there is presented a network node for triggering uplink PDU duplication from a user equipment. The network node comprises a configure module configured to configure the user equipment with an RLC URLLC mode. According to the RLC URLLC mode the user equipment is configured with an RLC trigger for the user equipment to perform uplink PDU duplication for an URLLC service.

According to a fourth aspect there is presented a computer program for triggering PDU duplication from a user equipment. The computer program comprises computer program code which, when run on processing circuitry of a network node, causes the network node to perform a method according to the first aspect.

According to a fifth aspect there is presented a method for uplink PDU duplication. The method is performed by a user equipment. The method comprises obtaining, from a network node, configuring of an RLC URLLC mode. According to the RLC URLLC mode the user equipment is configured an RLC trigger for the user equipment to perform uplink PDU duplication for an URLLC service. The method comprises performing the uplink PDU duplication for the URLLC service in accordance with the RLC URLLC mode.

According to a sixth aspect there is presented a user equipment for uplink PDU duplication. The user equipment comprises processing circuitry. The processing circuitry is configured to cause the user equipment to obtain, from a network node, configuring of an RLC URLLC mode. According to the RLC URLLC mode the user equipment is configured an RLC trigger for the user equipment to perform uplink PDU duplication for an URLLC service. The processing circuitry is configured to cause the user equipment to perform the uplink PDU duplication for the URLLC service in accordance with the RLC URLLC mode.

According to a seventh aspect there is presented a user equipment for uplink PDU duplication. The user equipment comprises an obtain module configured to obtain, from a network node, configuring of an RLC URLLC mode. According to the RLC URLLC mode the user equipment is configured an RLC trigger for the user equipment to perform uplink PDU duplication for an URLLC service. The user equipment comprises a retransmit module configured to perform the uplink PDU duplication for the URLLC service in accordance with the RLC URLLC mode.

According to an eighth aspect there is presented a computer program for uplink PDU duplication. The computer program comprises computer program code which, when run on processing circuitry of a user equipment, causes the user equipment to perform a method according to the fifth aspect.

According to a ninth aspect there is presented a computer program product comprising a computer program according to at least one of the fourth aspect and the eighth aspect and a computer readable storage medium on which the computer program is stored. The computer readable storage medium could be a non-transitory computer readable storage medium.

Advantageously, the transmission of PDUs belonging to URLLC services according to these aspects satisfy both reliability requirements and latency requirements.

Advantageously, these aspects enable earlier retransmission of the PDUs than the RLC round trip time (RTT) or HARQ round trip time.

Advantageously, these aspects provide efficient PDU duplication for the URLLC service without relying on feedback for retransmission of the PDUs as in RLC acknowledged mode.

Advantageously, these aspects provide efficient PDU duplication for the URLLC service whilst providing the reliability to achieve a bounded latency, as compared to RLC unacknowledged mode.

Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, module, step, etc." are to be interpreted openly as referring to at least one instance of the element, apparatus, component, means, module, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

Figures 1, 11:
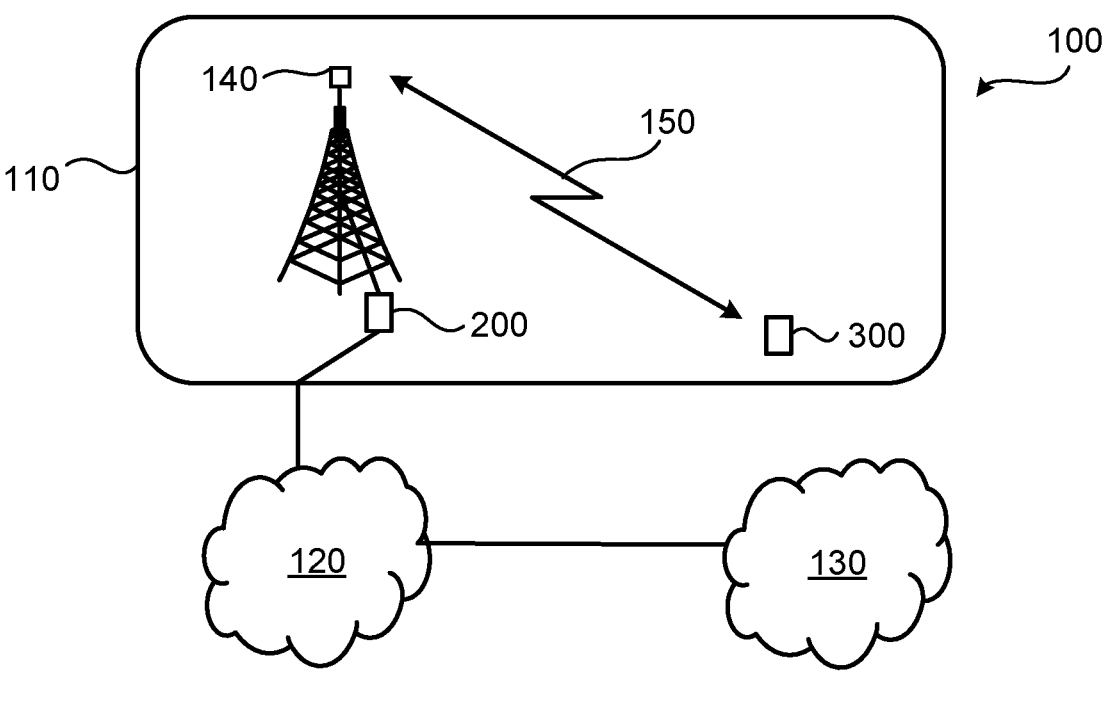
FIG. 1 is a schematic diagram illustrating a communication network according to embodiments.
FIG. 11 shows one example of a computer program product comprising computer readable means according to an embodiment.

FIG. 1 is a schematic diagram illustrating a communication network 100 where embodiments presented herein can be applied. The communication network 100 could be a third generation (3G) telecommunication network, a fourth generation (4G) telecommunication network, or a fifth (5G) telecommunication network and support any 3GPP telecommunications standard.

The communication network 100 comprises a transmission and reception point 140 configured to provide network access to user equipment 300 in an (radio) access network 110 over a radio propagation channel 150. The access network 110 is operatively connected to a core network 120. The core network 120 is in turn operatively connected to a service network 130, such as the Internet, an Intranet, or a private industrial network. The connection from the core network 120 to the service network 130 may be optional in some scenarios, e.g., when the core network 120 is providing services directly, such as in some private industrial networks. The user equipment 300 is thereby, via the transmission and reception point 140, enabled to access services of, and exchange data with, the service network 130 or core network 120. Operation of the transmission and reception point 140 is controlled by a network node 200. The network node 200 might be part of, collocated with, or integrated with the transmission and reception point 140. Examples of network nodes 200 are (radio) access network nodes, radio base stations, base transceiver stations, Node Bs (NBs), evolved Node Bs (eNBs), gNBs, access points, access nodes, and integrated access and backhaul nodes. Examples of user equipment 300 are wireless devices, mobile stations, mobile phones, handsets, wireless local loop phones, smartphones, laptop computers, tablet computers, network equipped sensors, network equipped vehicles, so-called Internet of Things devices, Virtual reality (VR) devices, Augmented reality (AR) devices, Extended reality (XR) devices, and network equipped gaming controllers.

As noted above, there is still a need for transmission techniques for PDUs belonging to URLLC services that enable both reliability requirements and latency requirements to be satisfied.

Figure 2:
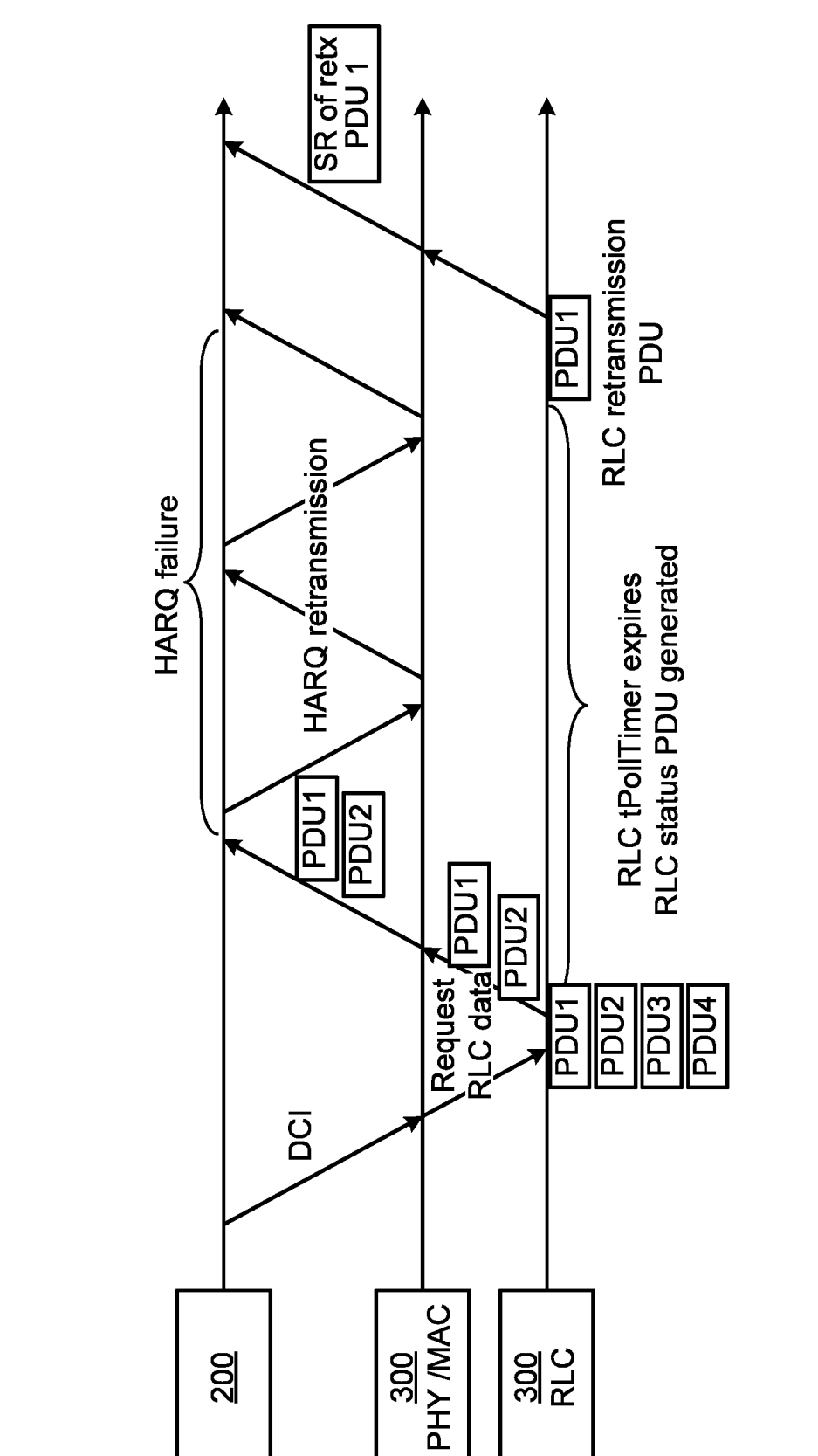
FIG. 2 is a signalling diagram of HARQ retransmission according to an example.

In this respect, reference is here made to the signalling diagram 2000 as shown in FIG. 2 for HARQ retransmission between a user equipment 300 and a network node 200. Operation at the user equipment 300 is illustrated separately for the MAC layer and the physical (PHY) layer on the one hand and at the RLC layer at the other hand. Information identifying which RLC mode to be used by the user equipment is sent from the network node 200 in downlink control information (DCI) but may alternatively be sent using other kind of information or signalling. Uplink transmission of PDUs denoted PDU1 and PDU2 is made after RLC data has been requested by the MAC/PHY layers to the RLC layer. HARQ retransmission of PDU1 and PDU2 is performed at MAC/PHY layers. The HARQ retransmission is assumed to fail. The PDUs are not correctly delivered to the network node 200 until the RLC timer tPollTimer expires. This causes retransmission of at least PDU1 at the RLC layer, which is illustrated to be correctly received correctly.

In some scenarios, such as for URLLC services, the value of tPollTimer is too long for latency requirements to be satisfied. According to at least some of the herein disclosed embodiments there is therefore provided an RLC mode, denoted RLC URLLC mode, that is specific for PDUs of a URLLC service. This RLC mode aims at achieving a service specific bounded latency for PDUs of the URLLC service, whilst still satisfying reliability requirements.

The embodiments disclosed herein in particular relate to mechanisms for triggering PDU duplication from a user equipment 300 and uplink PDU duplication. In order to obtain such mechanisms there is provided a network node 200, a method performed by the network node 200, a computer program product comprising code, for example in the form of a computer program, that when run on processing circuitry of the network node 200, causes the network node 200 to perform the method. In order to obtain such mechanisms there is further provided a user equipment 300, a method performed by the user equipment 300, and a computer program product comprising code, for example in the form of a computer program, that when run on processing circuitry of the user equipment 300, causes the user equipment 300 to perform the method.

Figure 3:
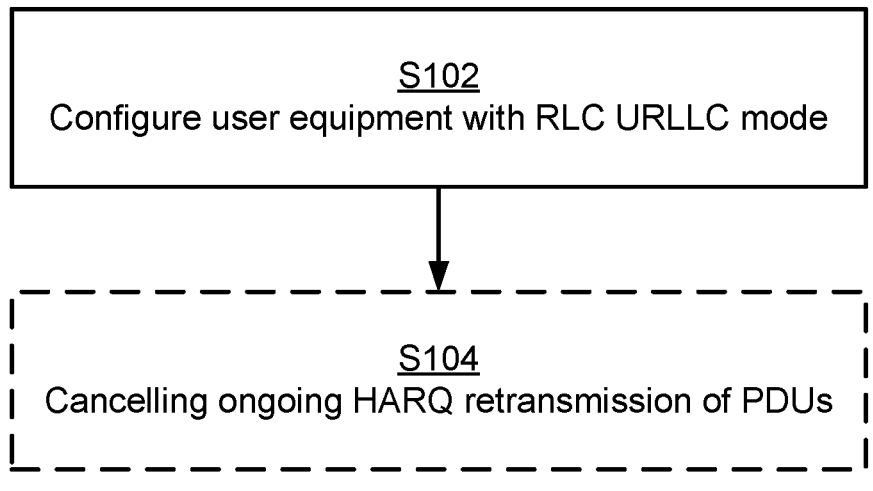
FIGS. 3 and 4 are flowcharts of methods according to embodiments.

Reference is now made to FIG. 3 illustrating a method for triggering PDU duplication from a user equipment 300 as performed by the network node 200 according to an embodiment.

S102: The network node 200 configures the user equipment 300 with an RLC URLLC mode. According to the RLC URLLC mode the user equipment 300 is configured with an RLC trigger for the user equipment 300 to perform uplink PDU duplication for an URLLC service. Uplink PDU duplication implies that the content of the PDU is transmitted at least twice in the uplink.

Embodiments relating to further details of triggering PDU duplication from a user equipment 300 as performed by the network node 200 will now be disclosed.

In some aspects, the network node 200 reschedules one or more retransmissions of uplink duplicate transmission of the PDUs for the URLLC service by cancelling at least one ongoing HARQ retransmission of these PDUs. Particularly, in some embodiments, the network node 200 is configured to perform (optional) step S104:

S104: The network node 200 cancels an ongoing HARQ retransmission of the PDUs for the URLLC service.

The ongoing HARQ retransmission might pertain to only retransmission of PDUs for URLLC service or to retransmission of PDUs for URLLC service multiplexed other PDUs for a non-URLLC service. Hence, in some embodiments, in the HARQ retransmission, the PDUs for the URLLC service are multiplexed with other PDUs for a non-URLLC service. In other embodiments, in the HARQ retransmission, there are only PDUs for the URLLC service.

This could for example be the case when the PDUs for the non-URLLC service have been already successfully received but the PDUs for the URLLC service have not been successfully received, and that potential soft combining gain will not be successful even if another complete HARQ retransmission is performed. The network node 200 might then decide to reschedule the retransmission of the PDUs for the URLLC service not yet correctly received, as in step S104. Hence, the network node 200 may reschedule the retransmission of the PDUs for the URLLC services with optimized parameters and/or resources to ensure the success of the retransmissions, considering e.g., the channel conditions and/or resource availabilities.

Discarding in the receiver at the network node 200 of duplicated PDUs which have already been successfully received can be made either on RLC level when RLC sequence numbers are employed or on PDCP level, which supports duplicate discarding based on PDCP sequence numbers.

Embodiments common for the network node 200 and the user equipment 300 will be disclosed below.

Figure 4:
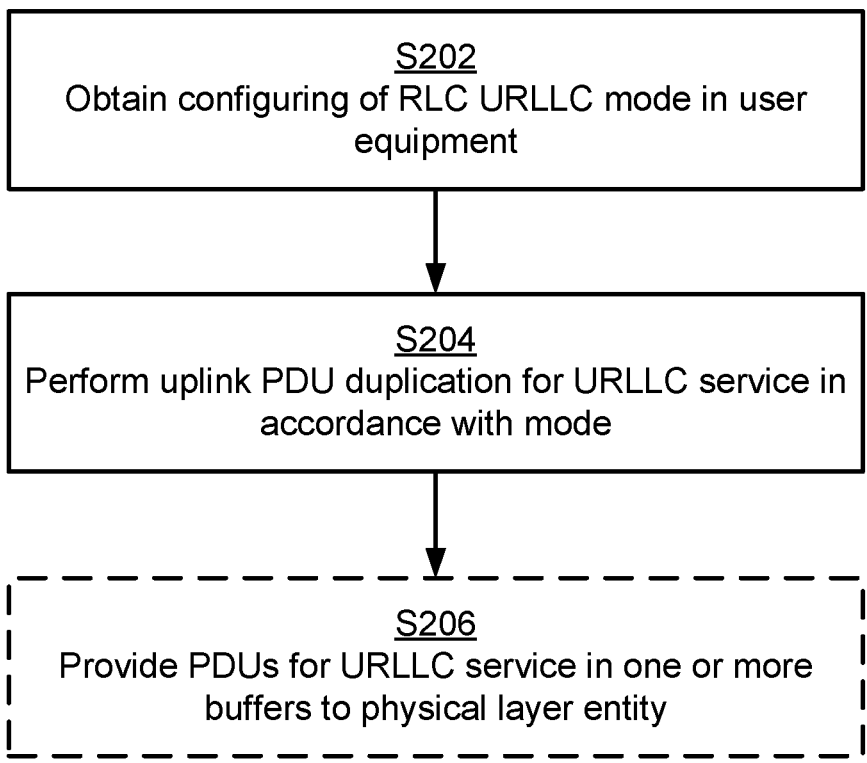

Reference is now made to FIG. 4 illustrating a method for uplink PDU duplication as performed by the user equipment 300 according to an embodiment.

S202: The user equipment 300 obtains, from the network node 200, configurations of an RLC URLLC mode. According to the RLC URLLC mode the user equipment 300 is configured with an RLC trigger for the user equipment 300 to perform uplink PDU duplication for an URLLC service.

S204: The user equipment 300 performs the uplink PDU duplication for the URLLC service in accordance with the RLC URLLC mode. Uplink PDU duplication implies that the content of the PDU is transmitted at least twice in the uplink.

Embodiments relating to further details of uplink PDU duplication as performed by the user equipment 300 will now be disclosed.

In general terms, buffer status reports indicate the original data only (i.e., only the original PDU, not its duplicate(s)). Two variants of handling the transmission buffer for the PDUs for the URLLC service may be utilized. According to a first variant, there is one transmission buffer from which multiple copies can be called, e.g. on demand based on scheduling. According to a second variant, there are multiple transmission buffers, one per copy (of the PDU), assuming that the copies are always used (since otherwise the multiple transmission buffers would go out of sync). In some aspects, the user equipment 300 thus provides the PDUs to a lower protocol layer either in one transmission buffer from which multiple copies can be called or in multiple transmission buffers, one per copy (of the PDU). Particularly, in some embodiments, the user equipment 300 is configured to perform (optional) step S206:

S206: The user equipment 300 provides, as part of performing the uplink PDU duplication for the URLLC service, the PDUs for the URLLC service to a physical layer entity either in a single buffer from which all duplicate transmission are to be made, or in as many buffers as there are duplicate transmissions to be made.

Alternatively, a pool of buffers can be shared among the duplicated transmissions. The size of the pool can be larger or smaller than the total number of duplicated transmissions to be made. The pool of buffers may also be optionally shared with other services, e.g., non-URLLC services.

In some aspects, the PDU duplication for the URLLC service is performed whilst a HARQ retransmission of the same PDUs is cancelled. That is, in some embodiments, the uplink PDU duplication for the URLLC service is performed despite the user equipment 300 having received an indication to cancel an ongoing HARQ retransmission of the PDUs for the URLLC service.

In some aspects, the PDU duplication for the URLLC service is performed whilst a HARQ retransmission of the same PDUs is still ongoing. That is, in some embodiments, the uplink PDU duplication for the URLLC service is performed whilst a HARQ retransmission of the PDUs for the URLLC service is still ongoing.

Embodiments common for the network node 200 and the user equipment 300 will be disclosed next.

Aspects of the URLLC service will now be disclosed.

There could be different types of URLLC services. In some non-limiting examples, the URLLC service corresponds to a quality-of-service (QOS) and/or a latency requirement. In some non-limiting examples, the QoS requirement is defined by QoS identifier 5QI. In some non-limiting examples, 5QI E {4, 5, 6, 8, 9, 69, 70, 80, 84, 85}.

Aspects of the RLC trigger will be disclosed next.

In some aspects, the network node 200 indicates with certain indication, by providing the RLC trigger in a downlink control information (DCI) or in a MAC control element (CE), to the user equipment 300 that duplicates of the PDUs shall be retransmitted. Particularly, in some embodiments, the RLC trigger is provided in a DCI, or as an indication for the user equipment 300 to enter a dedicated RLC URLLC mode, or in a MAC CE. In this respect, a mapping between a certain DCI field to using either original or duplicate PDUs from the RLC may be included. Alternatively, a mapping between a certain MAC CE or certain bits in a field in the MAC CE to use either original or duplicate PDUs from the RLC may be included. Alternatively, an implicit mapping may be utilized between resources to whether original or duplicate PDUs shall be utilized. For example, when resources of a certain frequency range, multiple-input multiple-output (MIMO) layer, transmission and reception point, or carrier are scheduled, according to a configured mapping, either only original or duplicate PDUs are to be transmitted. In some aspects, the network node 200 indicates with certain indication, by providing the RLC trigger on a logical channel or at radio bearer level. Particularly, in some embodiments, the RLC trigger is provided on a logical channel or on radio bearer level from the network node 200 to the user equipment 300. In this respect, further logical channel transmission restrictions can be employed to selectively select only certain logical channels for transmission (i.e. the LCH with the URLLC RLC).

Aspects of different configuring, as given by the RLC URLLC mode, of how the user equipment 300 is to perform the uplink PDU duplication for the URLLC service will be disclosed next.

In some aspects, a PDU is, upon transmission (i.e., initial transmission), immediately considered negatively acknowledged, and thus selected for retransmission. Particularly, in some embodiments, according to the configuring, the PDUs for the URLLC service is, upon transmission (i.e., initial transmission), immediately considered to be negatively acknowledged regardless whether positive or negative acknowledgement is received from the network node 200. Upon determining the negative acknowledgment, retransmission, might be immediately performed or performed at a predetermined delay according some configurations, either given in the RCL URLLC mode configuration, a DCI, a MAC CE, or based on the RLC trigger.

In some aspects, a maximum number of PDU duplicates is configured. Particularly, in some embodiments, according to the configuring, the uplink PDU duplication for the URLLC service is to be performed at most for a maximum number of duplicates of the PDUs for the URLLC service. The user equipment 300 will then provide duplicates of each PDU up to this maximum number. The retransmission of the uplink PDU duplication for the URLLC service in step S204 will then be performed up to the configured maximum number of retransmissions. The retransmissions might be performed back-to-back, or according to some time intervals according to some configurations, either given in the RCL URLLC mode configuration, a DCI, a MAC CE, or based on the RLC trigger.

In some aspects, no further duplicates of the PDUs shall be transmitted when a status report indicates successful transmission of the PDUs. Particularly, in some embodiments, according to the configuring, the uplink PDU duplication for the URLLC service is to be performed until reception of an indication of successful transmission of the PDUs for the URLLC service. The user equipment 300 will then refrain from further retransmission of the uplink duplicate transmission of the PDUs for the URLLC service in step S204 when having received a status report indicates successful transmission, regardless of any configured maximum number of retransmissions.

In some aspects, PDU duplication shall be made when the maximum number of HARQ retransmissions of a transport including the PDUs for the URLLC service fails. Particularly, in some embodiments, according to the configuring, the uplink PDU duplication for the URLLC service is to be performed when a maximum number of HARQ retransmissions of a transport block including the PDUs for the URLLC service fails.

In some aspects, PDU duplication shall be made only for a certain time after the original PDU was transmitted. Particularly, in some embodiments, according to the configuring, the uplink PDU duplication for the URLLC service is to be performed at most during a maximum amount of time from initial transmission of the PDUs for the URLLC service. Thus, after the maximum amount of time has passed since initial transmission of the PDUs for the URLLC service, no further duplicates of this PDU shall be transmitted.

Compared to ordinary HARQ retransmissions, the herein disclosed uplink PDU duplication for the URLLC service can be multiplexed with other logical channels to build bigger transport blocks when radio condition allow, or be segmented to smaller piece when radio condition is poor. Particularly, in some embodiments, according to the configuring, the uplink PDU duplication for the URLLC service is to be multiplexed with other PDUs for a non-URLLC service, and in other embodiments, according to the configuring, the uplink PDU duplication for the URLLC service is to be segmented RLC PDU segments. Assume, for example, that there is a transport block carrying both PDUs for a non-URLLC service, such as an enhanced mobile broadband (eMBB) service, and PDUs for a URLLC service and that transmission of this transport block fails. Assume further, for example, that the radio condition does not allow retransmission of the whole transmission block even if soft combining is used at the receiver. Then the herein disclosed embodiments enable retransmission of only the PDUs for the URLLC service on another transport block, which can be smaller in size than the transport block where the PDUs for the URLLC service where transmitted together with the PDUs for the non-URLLC service.

The herein disclosed RLC URLLC mode can be provided as a stand-alone RLC mode or be provided as an extension to an existing RLC mode. Hence, the herein disclosed RLC mode of operation is also applicable to existing RLC modes. Further aspects relating thereto will now be disclosed.

In some aspects, the herein disclosed RLC URLLC mode is based on the RLC unacknowledged mode (RLC UM) according to which no sequence numbers are assigned to PDUs unless segmentation is required. Particularly, in some embodiments, according to the configuring, the uplink PDU duplication for the URLLC service is to be performed as an extension to an RLC unacknowledged mode. In some aspects, when the herein disclosed RLC URLLC mode is based on the RLC unacknowledged mode, the RLC URLLC mode is only applied for new PDUs. Particularly, in some embodiments, to the configuring, the uplink PDU duplication for the URLLC service is to be performed only for PDUs for the URLLC service which have yet not been transmitted.

In some aspects, the herein disclosed RLC URLLC mode is based on the RLC acknowledged mode (RLC AM), with the herein disclosed RLC trigger utilized to consider an RLC SDU/PDU as negatively acknowledged for retransmission. Particularly, in some embodiments, according to the configuring, the uplink PDU duplication for the URLLC service is to be performed as an extension to an RLC acknowledged mode. In some aspects, when the herein disclosed RLC URLLC mode is based on the RLC acknowledged mode, the RLC URLLC mode is used to for retransmission of negatively acknowledged PDUs. Particularly, in some embodiments, according to the configuring, the uplink PDU duplication for the URLLC service is to be performed for at least one of: PDUs for the URLLC service yet to be transmitted, and transmitted PDUs for the URLLC service for which a negative acknowledgement (NACK) has been received by the user equipment 300.

The duplicates of the PDUs for the URLLC service may be provided also upon request from lower protocol layers (i.e., the PHY layer or the MAC layer). When the RLC URLLC mode is an extension to the RLC acknowledged mode, the request from a lower protocol layer is considered as an RLC trigger for considering the previous, or a number of previous, PDUs as negatively acknowledged, where retransmission is to be immediately performed.

Figure 5:
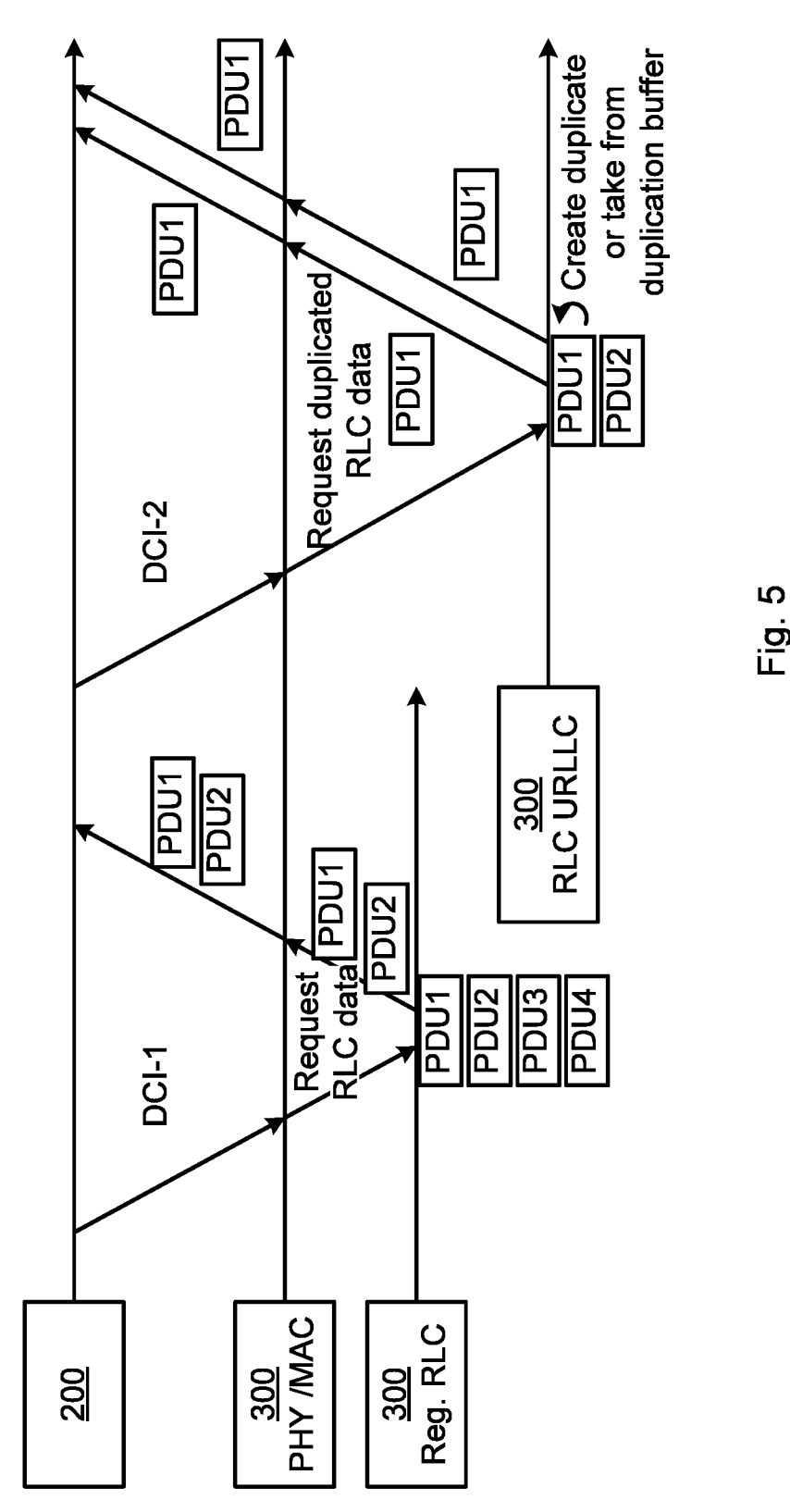
FIGS. 5 and 6 are signalling diagrams of PDU duplication according to embodiments.

A first particular embodiment for triggering PDU duplication from a user equipment 300 and for uplink PDU duplication based on at least some of the above disclosed embodiments will now be disclosed in detail with reference to the signalling diagram 5000 of FIG. 5. Operation at the user equipment 300 is illustrated separately for the MAC layer and the PHY layer on the one hand and for the RLC layer at the other hand. Further, operation at the RLC layer is, for illustrative purposes, split into two so as to separately illustrate operation of a regular RLC mode (such as RLC acknowledged mode or RLC unacknowledged mode) at the one hand and the herein disclosed RLC URLLC mode at the other hand. First DCI, denoted DCI-1, identifying that the regular RLC mode is to be used by the user equipment 300, is sent from the network node 200. PDUs denoted PDU1, PDU2, PDU3 and PDU4 are in a buffer at the RLC layer. Uplink transmission of PDU1 and PDU2 is made after RLC data has been requested by the MAC/PHY layers to the RLC layer. PDU1 and PDU2 are then transmitted according to the regular RLC mode. If PDU1 and/or PDU2 is/are not correctly received, this will trigger HARQ retransmission, as in FIG. 2. Second DCI, denoted DCI-2, identifying that the RLC URLLC mode is to be used by the user equipment 300, is sent from the network node 200. Accordingly, duplicated transmission of each PDU is requested. PDUs denoted PDU1 and PDU2 are in a buffer at the RLC layer. Uplink transmission of PDU1 is made after RLC data has been requested by the MAC/PHY layers to the RLC layer. Since the RLC URLLC mode is used, a duplicate of PDU1 is either created or taken from a duplication buffer. At least two duplicates of PDU1 are then transmitted towards the network node 200. The at least two duplicates of PDU1 might, for example, be sent towards different transmission and reception points, in different frequency bands, or at different time instances.

Figure 6:
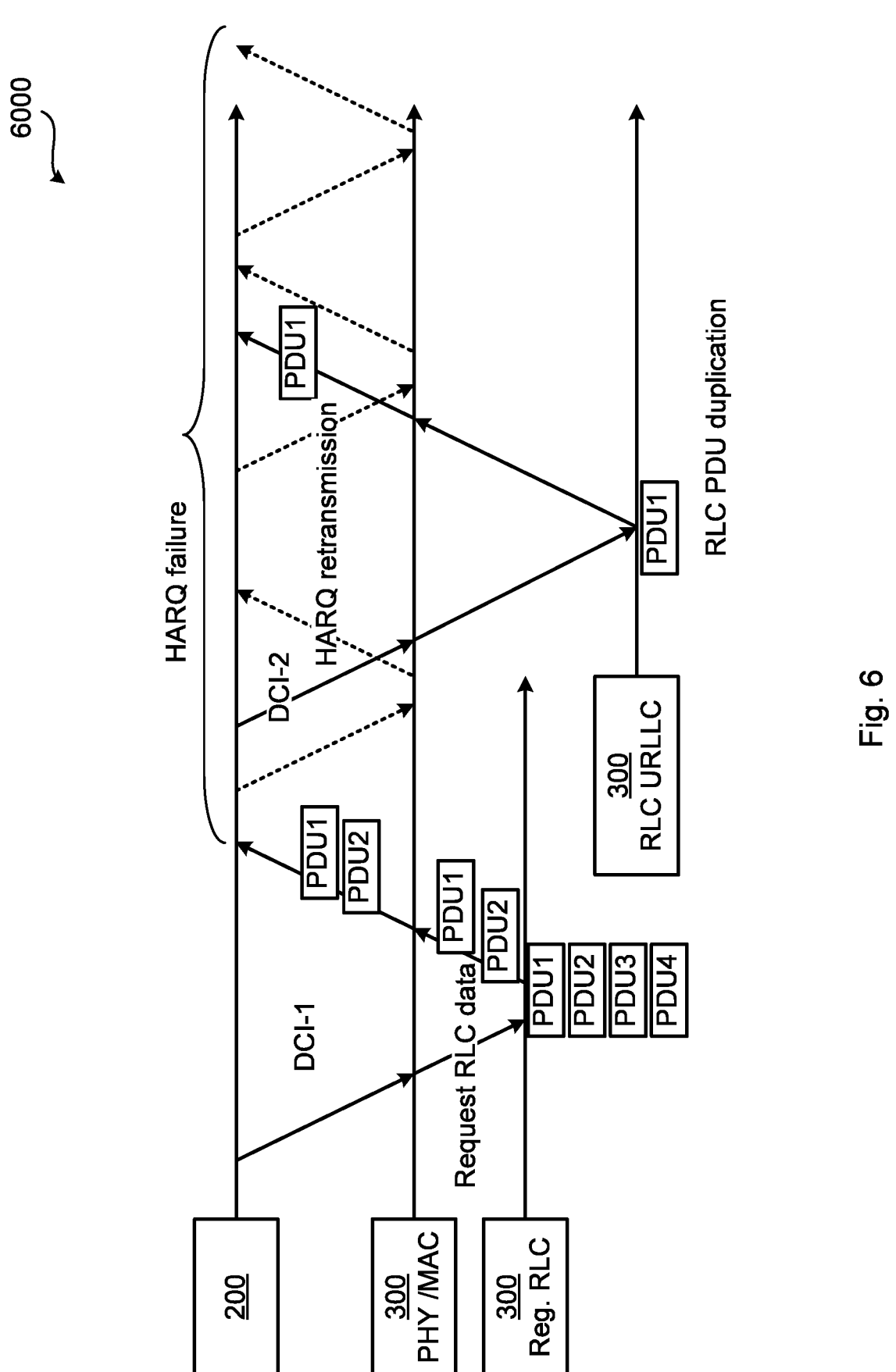

A second particular embodiment for triggering PDU duplication from a user equipment 300 and for uplink PDU duplication based on at least some of the above disclosed embodiments will now be disclosed in detail with reference to the signalling diagram 6000 of FIG. 6. Operation at the user equipment 300 is illustrated separately for the MAC layer and the PHY layer on the one hand and for the RLC layer at the other hand. Further, operation at the RLC layer is, for illustrative purposes, split into two so as to separately illustrate operation of a regular RLC mode (such as RLC acknowledged mode or RLC unacknowledged mode) at the one hand and the herein disclosed RLC URLLC mode at the other hand. First DCI, denoted DCI-1, identifying that the regular RLC mode is to be used by the user equipment 300, is sent from the network node 200. PDUs denoted PDU1, PDU2, PDU3 and PDU4 are in a buffer at the RLC layer. Uplink transmission of PDU1 and PDU2 is made after RLC data has been requested by the MAC/PHY layers to the RLC layer. PDU1 and PDU2 are then transmitted according to the regular RLC mode. It is here assumed that PDU1 and/or PDU2 is/are not correctly received. This triggers HARQ retransmission of PDU1 and/or PDU2. It is further assumed that the HARQ retransmission of PDU1 and/or PDU2 fails. Second DCI, denoted DCI-2, identifying that the RLC URLLC mode is to be used by the user equipment 300, is sent from the network node 200. DCI-2 is sent upon the HARQ retransmission of PDU1 and/or PDU2 having started. Duplicated transmission of at least PDU1 is requested. Uplink retransmission of PDU1 is then made in parallel with the ongoing HARQ retransmission.

Figure 7:
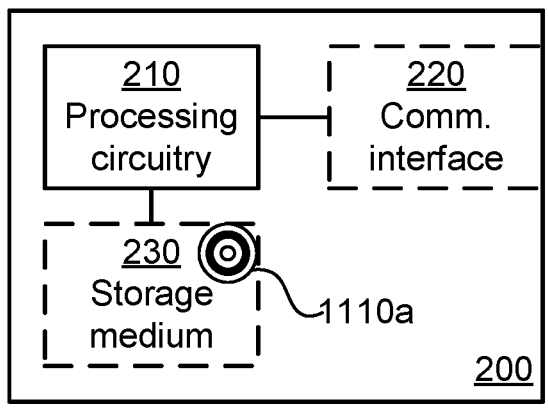
FIG. 7 is a schematic diagram showing functional units of a network node according to an embodiment.

FIG. 7 schematically illustrates, in terms of a number of functional units, the components of a network node 200 according to an embodiment. Processing circuitry 210 is provided using any combination of one or more of a suitable central processing unit (CPU), multiprocessor, microcontroller, digital signal processor (DSP), etc., capable of executing software instructions stored in a computer program product 1110*a* (as in FIG. 11), e.g. in the form of a storage medium 230. The processing circuitry 210 may further be provided as at least one application specific integrated circuit (ASIC), or field programmable gate array (FPGA).

Particularly, the processing circuitry 210 is configured to cause the network node 200 to perform a set of operations, or steps, as disclosed above. For example, the storage medium 230 may store the set of operations, and the processing circuitry 210 may be configured to retrieve the set of operations from the storage medium 230 to cause the network node 200 to perform the set of operations. The set of operations may be provided as a set of executable instructions. Thus the processing circuitry 210 is thereby arranged to execute methods as herein disclosed.

The storage medium 230 may also comprise persistent storage, which, for example, can be any single one or combination of magnetic memory, optical memory, solid state memory or even remotely mounted memory.

The network node 200 may further comprise a communications interface 220 for communications with other entities, functions, nodes, and devices, such as the user equipment 300. As such the communications interface 220 may comprise one or more transmitters and receivers, comprising analogue and digital components.

The processing circuitry 210 controls the general operation of the network node 200 e.g. by sending data and control signals to the communications interface 220 and the storage medium 230, by receiving data and reports from the communications interface 220, and by retrieving data and instructions from the storage medium 230. Other components, as well as the related functionality, of the network node 200 are omitted in order not to obscure the concepts presented herein.

Figure 8:
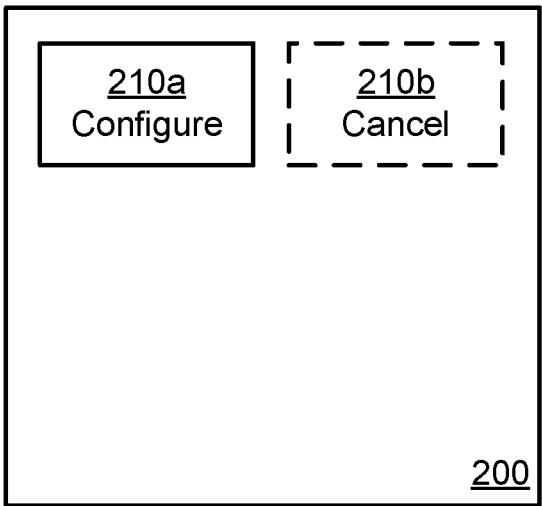
FIG. 8 is a schematic diagram showing functional modules of a network node according to an embodiment.

FIG. 8 schematically illustrates, in terms of a number of functional modules, the components of a network node 200 according to an embodiment. The network node 200 of FIG. 8 comprises a configure module 210*a* configured to perform step S102. The network node 200 of FIG. 8 may further comprise a number of optional functional modules, such as a cancel module 210*b* configured to perform step S104. In general terms, each functional module 210*a*:210*b* may be implemented in hardware or in software. Preferably, one or more or all functional modules 210*a*:210*b* may be implemented by the processing circuitry 210, possibly in cooperation with the communications interface 220 and/or the storage medium 230. The processing circuitry 210 may thus be arranged to from the storage medium 230 fetch instructions as provided by a functional module 210*a*:210*b* and to execute these instructions, thereby performing any steps of the network node 200 as disclosed herein.

The network node 200 may be provided as a standalone device or as a part of at least one further device. For example, the network node 200 may be provided in a node of the radio access network or in a node of the core network. Alternatively, functionality of the network node 200 may be distributed between at least two devices, or nodes. These at least two nodes, or devices, may either be part of the same network part (such as the radio access network or the core network) or may be spread between at least two such network parts. In general terms, instructions that are required to be performed in real time may be performed in a device, or node, operatively closer to the cell than instructions that are not required to be performed in real time.

Thus, a first portion of the instructions performed by the network node 200 may be executed in a first device, and a second portion of the instructions performed by the network node 200 may be executed in a second device; the herein disclosed embodiments are not limited to any particular number of devices on which the instructions performed by the network node 200 may be executed. Hence, the methods according to the herein disclosed embodiments are suitable to be performed by a network node 200 residing in a cloud computational environment. Therefore, although a single processing circuitry 210 is illustrated in FIG. 7 the processing circuitry 210 may be distributed among a plurality of devices, or nodes. The same applies to the functional modules 210*a*:210*b* of FIG. 8 and the computer program 1120*a* of FIG. 11.

Figure 9:
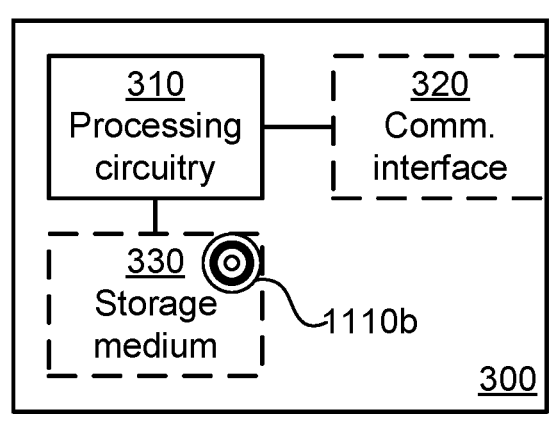
FIG. 9 is a schematic diagram showing functional units of a user equipment according to an embodiment.

FIG. 9 schematically illustrates, in terms of a number of functional units, the components of a user equipment 300 according to an embodiment. Processing circuitry 310 is provided using any combination of one or more of a suitable central processing unit (CPU), multiprocessor, microcontroller, digital signal processor (DSP), etc., capable of executing software instructions stored in a computer program product 1110*b* (as in FIG. 11), e.g. in the form of a storage medium 330. The processing circuitry 310 may further be provided as at least one application specific integrated circuit (ASIC), or field programmable gate array (FPGA).

Particularly, the processing circuitry 310 is configured to cause the user equipment 300 to perform a set of operations, or steps, as disclosed above. For example, the storage medium 330 may store the set of operations, and the processing circuitry 310 may be configured to retrieve the set of operations from the storage medium 330 to cause the user equipment 300 to perform the set of operations. The set of operations may be provided as a set of executable instructions. Thus the processing circuitry 310 is thereby arranged to execute methods as herein disclosed.

The storage medium 330 may also comprise persistent storage, which, for example, can be any single one or combination of magnetic memory, optical memory, solid state memory or even remotely mounted memory.

The user equipment 300 may further comprise a communications interface 320 for communications with other entities, functions, nodes, and devices, such as the network node 200. As such the communications interface 320 may comprise one or more transmitters and receivers, comprising analogue and digital components.

The processing circuitry 310 controls the general operation of the user equipment 300 e.g. by sending data and control signals to the communications interface 320 and the storage medium 330, by receiving data and reports from the communications interface 320, and by retrieving data and instructions from the storage medium 330. Other components, as well as the related functionality, of the user equipment 300 are omitted in order not to obscure the concepts presented herein.

Figure 10:
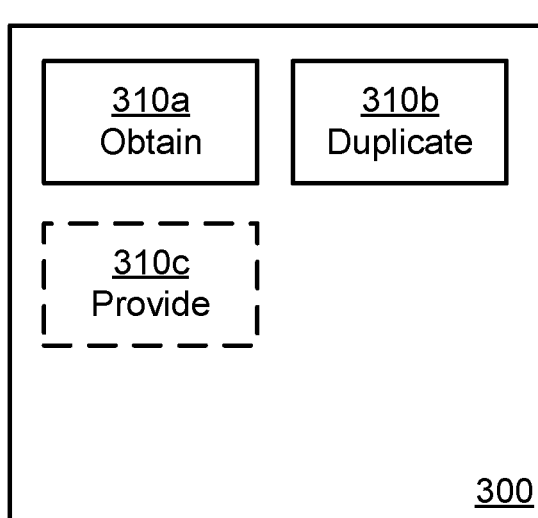
FIG. 10 is a schematic diagram showing functional modules of a user equipment according to an embodiment.

FIG. 10 schematically illustrates, in terms of a number of functional modules, the components of a user equipment 300 according to an embodiment. The user equipment 300 of FIG. 10 comprises a number of functional modules; an obtain module 310a configured to perform step S202, and a duplicate module 310b configured to perform step S204. The user equipment 300 of FIG. 10 may further comprise a number of optional functional modules, such as a provide module 310c configured to perform step S206. In general terms, each functional module 310a:310c may be implemented in hardware or in software. Preferably, one or more or all functional modules 310a:310c may be implemented by the processing circuitry 310, possibly in cooperation with the communications interface 320 and/or the storage medium 330. The processing circuitry 310 may thus be arranged to from the storage medium 330 fetch instructions as provided by a functional module 310a:310c and to execute these instructions, thereby performing any steps of the user equipment 300 as disclosed herein.

FIG. 11 shows one example of a computer program product 1110a, 1110b comprising computer readable means 1130. On this computer readable means 1130, a computer program 1120a can be stored, which computer program 1120a can cause the processing circuitry 210 and thereto operatively coupled entities and devices, such as the communications interface 220 and the storage medium 230, to execute methods according to embodiments described herein. The computer program 1120a and/or computer program product 1110a may thus provide means for performing any steps of the network node 200 as herein disclosed. On this computer readable means 1130, a computer program 1120b can be stored, which computer program 1120b can cause the processing circuitry 310 and thereto operatively coupled entities and devices, such as the communications interface 320 and the storage medium 330, to execute methods according to embodiments described herein. The computer program 1120b and/or computer program product 1110b may thus provide means for performing any steps of the user equipment 300 as herein disclosed.

In the example of FIG. 11, the computer program product 1110a, 1110b is illustrated as an optical disc, such as a CD (compact disc) or a DVD (digital versatile disc) or a Blu-Ray disc. The computer program product 1110a, 1110b could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 1120a, 1120b is here schematically shown as a track on the depicted optical disk, the computer program 1120a, 1120b can be stored in any way which is suitable for the computer program product 1110a, 1110b.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A method for triggering uplink protocol data unit, PDU, duplication from a user equipment, the method being performed by a network node, the method comprising:

configuring the user equipment with a radio link control, RLC, ultra-reliable low latency, URLLC, mode, wherein according to the RLC URLLC mode the user equipment is configured with an RLC trigger for the user equipment to perform uplink PDU duplication for an URLLC service, wherein, according to the configuring, the PDUs for the URLLC service is, upon transmission, immediately considered to be negatively acknowledged regardless whether positive or negative acknowledgement is received from the network node.

2. The method according to claim 1, wherein the method further comprises:

cancelling an ongoing HARQ retransmission of the PDUs for the URLLC service.

3. The method according to claim 2, wherein in the HARQ retransmission, the PDUs for the URLLC service are multiplexed with other PDUs for a non-URLLC service, or wherein in the HARQ retransmission, there are only PDUs for the URLLC service.

4. The method according to claim 1, wherein, according to the configuring, the uplink PDU duplication for the URLLC service is to be performed at most for a maximum number of duplicates of the PDUs for the URLLC service, and/or according to the configuring, the uplink PDU duplication for the URLLC service is to be performed until reception of an indication of successful transmission of the PDUs for the URLLC service, and/or according to the configuring, the uplink PDU duplication for the URLLC service is to be performed when a maximum number of HARQ retransmissions of a transport block including the PDUs for the URLLC service fails, and/or according to the configuring the uplink PDU duplication for the URLLC service is to be performed at most during a maximum amount of time from initial transmission of the PDUs for the URLLC service.

5. The method according to claim 1, wherein, according to the configuring, the uplink PDU duplication for the URLLC service is to be multiplexed with other PDUs for a non-URLLC service.

6. The method according to claim 1, wherein, according to the configuring, the uplink PDU duplication for the URLLC service is to be segmented RLC PDU segments.

7. The method according to claim 1, wherein, according to the configuring, the uplink PDU duplication for the URLLC service is to be performed as an extension to an RLC unacknowledged mode.

8. The method according to claim 1, wherein, according to the configuring, the uplink PDU duplication for the URLLC service is to be performed as an extension to an RLC acknowledged mode.

9. A method for uplink protocol data unit, PDU, duplication, the method being performed by a user equipment, the method comprising:

obtaining, from a network node, configuring of a radio link control, RLC, ultra-reliable low latency, URLLC, mode, wherein according to the RLC URLLC mode the user equipment is configured an RLC trigger for the user equipment to perform uplink PDU duplication for an URLLC service; and performing the uplink PDU duplication for the URLLC service in accordance with the RLC URLLC mode, wherein, according to the configuring, the PDUs for the URLLC service is, upon transmission, immediately considered to be negatively acknowledged regardless whether positive or negative acknowledgement is received from the network node.

10. The method according to claim 9, wherein the method further comprises:

providing, as part of performing the uplink PDU duplication for the URLLC service, the PDUs for the URLLC service to a physical layer entity either in a single buffer from which all duplicate transmission are to be made, or in as many buffers as there are duplicate transmissions to be made.

11. The method according to claim 9, wherein the uplink PDU duplication for the URLLC service is performed despite the user equipment having performed an indication to cancel an ongoing HARQ retransmission of the PDUs for the URLLC service.

12. The method according to claim 9, wherein the uplink PDU duplication for the URLLC service is performed whilst a HARQ retransmission of the PDUs for the URLLC service is still ongoing.

13. The method according to claim 9, wherein, according to the configuring, the uplink PDU duplication for the URLLC service is to be performed at most for a maximum number of duplicates of the PDUs for the URLLC service, and/or according to the configuring, the uplink PDU duplication for the URLLC service is to be performed until reception of an indication of successful transmission of the PDUs for the URLLC service, and/or according to the configuring, the uplink PDU duplication for the URLLC service is to be performed when a maximum number of HARQ retransmissions of a transport block including the PDUs for the URLLC service fails, and/or according to the configuring, the uplink PDU duplication for the URLLC service is to be performed at most during a maximum amount of time from initial transmission of the PDUs for the URLLC service.

14. The method according to claim 9, wherein, according to the configuring, the uplink PDU duplication for the URLLC service is to be multiplexed with other PDUs for a non-URLLC service.

15. The method according to claim 9, wherein, according to the configuring, the uplink PDU duplication for the URLLC service is to be segmented RLC PDU segments.

16. The method according to claim 9, wherein, according to the configuring, the uplink PDU duplication for the URLLC service is to be performed as an extension to an RLC unacknowledged mode.

17. The method according to claim 9, wherein, according to the configuring, the uplink PDU duplication for the URLLC service is to be performed as an extension to an RLC acknowledged mode.

\* \* \* \* \*